United States Patent
Suzuki et al.

(10) Patent No.: US 12,005,818 B2
(45) Date of Patent: Jun. 11, 2024

(54) SEAT APPARATUS AND NOTIFICATION DEVICE FOR VEHICLE

(71) Applicant: AISIN CORPORATION, Aichi (JP)

(72) Inventors: Yoshihisa Suzuki, Kariya (JP); Takuro Kurisu, Kariya (JP)

(73) Assignee: AISIN CORPORATION, Kariya (JP)

( * ) Notice: Subject to any disclaimer, the term of this patent is extended or adjusted under 35 U.S.C. 154(b) by 444 days.

(21) Appl. No.: 17/198,487

(22) Filed: Mar. 11, 2021

(65) Prior Publication Data
US 2021/0291705 A1  Sep. 23, 2021

(30) Foreign Application Priority Data
Mar. 18, 2020 (JP) ................................ 2020-047448

(51) Int. Cl.
*B60N 2/30* (2006.01)
*B60N 2/02* (2006.01)

(52) U.S. Cl.
CPC ........... *B60N 2/30* (2013.01); *B60N 2/02246* (2023.08); *B60N 2/0248* (2013.01); *B60N 2/0272* (2023.08)

(58) Field of Classification Search
CPC .. B60N 2/0232; B60N 2/0244; B60N 2/0248; B60N 2/22; B60N 2/30; B60N 2/3011; B60N 2/3065; B60N 2/3079; B60N 2/309; B60N 2002/0272
See application file for complete search history.

(56) References Cited

U.S. PATENT DOCUMENTS

| | | | | |
|---|---|---|---|---|
| 4,669,780 A | * | 6/1987 | Sakakibara | B61D 33/0021 296/64 |
| 6,400,259 B1 | * | 6/2002 | Bourcart | B60N 2/0276 340/425.5 |
| 2003/0184112 A1 | * | 10/2003 | Furui | B60N 2/0248 296/65.01 |
| 2004/0140783 A1 | * | 7/2004 | Fukuhara | B60N 2/12 318/467 |
| 2004/0195875 A1 | * | 10/2004 | Skelly | B64D 11/0624 297/217.3 |
| 2005/0236881 A1 | * | 10/2005 | Suda | B60N 2/3009 297/378.1 |
| 2007/0052273 A1 | * | 3/2007 | Satta | B60N 2/309 297/378.12 |
| 2008/0021618 A1 | * | 1/2008 | Nathan | B60N 2/0244 701/49 |

(Continued)

FOREIGN PATENT DOCUMENTS

| | | |
|---|---|---|
| JP | 2007-062511 A | 3/2007 |
| JP | 2008-308135 A | 12/2008 |
| JP | 2011-42295 A | 3/2011 |

*Primary Examiner* — Fadey S. Jabr
*Assistant Examiner* — Michael J Herrera
(74) *Attorney, Agent, or Firm* — Oblon, McClelland, Maier & Neustadt, L.L.P.

(57) ABSTRACT

A seat apparatus for a vehicle includes an event detection unit configured to detect an occurrence of an event making a buzzer operate for each of plural seats sharing the buzzer, and a notification control unit configured to operate notification control of the buzzer in accordance with the event. The notification control unit is configured to prioritize and operate one of the plural notification controls which operate duplicately in a case where there are the plural seats in which the event occurs.

20 Claims, 6 Drawing Sheets

(56) References Cited

U.S. PATENT DOCUMENTS

| | | | |
|---|---|---|---|
| 2010/0133870 A1* | 6/2010 | Kan | B60N 2/3011 |
| | | | 296/65.09 |
| 2011/0043009 A1* | 2/2011 | Inayoshi | B60N 2/002 |
| | | | 340/436 |
| 2011/0043015 A1* | 2/2011 | Maeda | B60N 2/3065 |
| | | | 297/311 |
| 2012/0203378 A1* | 8/2012 | Yank, III | B60N 2/986 |
| | | | 700/275 |
| 2016/0239175 A1* | 8/2016 | Suzuki | G06F 3/04842 |
| 2016/0280095 A1* | 9/2016 | Frye | B60N 2/0244 |
| 2017/0050613 A1* | 2/2017 | Lee | B60R 22/48 |
| 2017/0158086 A1* | 6/2017 | Kwon | B60N 2/809 |
| 2017/0166089 A1* | 6/2017 | Frye | B60N 2/08 |
| 2017/0217335 A1* | 8/2017 | Tominaga | B60N 2/0228 |
| 2017/0225591 A1* | 8/2017 | Tobata | B60N 2/80 |
| 2017/0341529 A1* | 11/2017 | Uno | B60N 2/0252 |
| 2018/0111511 A1* | 4/2018 | Lota | B60N 2/0244 |
| 2018/0141477 A1* | 5/2018 | Stevens | B60N 2/0232 |
| 2018/0304770 A1* | 10/2018 | Nishizaki | G06K 7/10366 |
| 2019/0160974 A1* | 5/2019 | Ohmura | B60N 2/0244 |
| 2019/0184933 A1* | 6/2019 | Yamamoto | B60R 22/48 |
| 2020/0017000 A1* | 1/2020 | Lee | B60N 2/22 |

* cited by examiner

FIG. 10

| Priority | | Buzzer notification event |
|---|---|---|
| High | 1 | Catch detection & reverse operation buzzer |
| ↑ | 2 | Seat prohibition position buzzer |
| | 3 | Original position unlearned buzzer |
| | 4 | Operation start buzzer |
| | 5 | Operation end buzzer |
| Low | 6 | Operation condition failure buzzer |

SEAT APPARATUS AND NOTIFICATION DEVICE FOR VEHICLE

CROSS REFERENCE TO RELATED APPLICATIONS

This application is based on and claims priority under 35 U.S.C. § 119 to Japanese Patent Application 2020-047448, filed on Mar. 18, 2020, the entire content of which is incorporated herein by reference.

TECHNICAL FIELD

This disclosure generally relates to a seat apparatus and a notification device for a vehicle.

BACKGROUND DISCUSSION

A known vehicle includes a buzzer for operating notification output with buzzer sounds for a user of the vehicle. For example, a seat apparatus disclosed in JP2007-62511A (hereinafter referred to as Patent reference 1) controls a retractable seat, retracted in a folded state in a storage recessed portion provided at a vehicle floor, to be extended and retracted by driving a motor. According to Patent reference 1, the corresponding notification control of a buzzer is configured to operate when the operation control of the retractable seat starts and ends, or when the abnormality is detected.

However, for example, in a case where plural in-vehicle devices such as right-left retractable seats share one buzzer, that is, in a configuration in which the plural on-vehicle devices operate notification output by using the common or same buzzer, plural events making the buzzer operate may occur in close timing. Thus, because the plural notification controls duplicately operate, the effect of the notification output by the operation of the buzzer is decreased.

A need thus exists for a seat apparatus and a notification device for a vehicle which is not susceptible to the drawback mentioned above.

SUMMARY

According to an aspect of this disclosure, a seat apparatus for a vehicle includes an event detection unit configured to detect an occurrence of an event making a buzzer operate for each of plural seats sharing the buzzer, and a notification control unit configured to operate notification control of the buzzer in accordance with the event. The notification control unit is configured to prioritize and operate one of the plural notification controls which operate duplicately in a case where there are the plural seats in which the event occurs.

According to another aspect of this disclosure, a notification device for a vehicle includes an event detection unit configured to detect an occurrence of an event making a buzzer operate for each of plural in-vehicle devices sharing the buzzer, and a notification control unit configured to operate notification control of the buzzer in accordance with the event. The notification control unit is configured to prioritize and operate one of the plural notification controls which operate duplicately in a case where there are the plural in-vehicle devices in which the event occurs.

BRIEF DESCRIPTION OF THE DRAWINGS

The foregoing and additional features and characteristics of this disclosure will become more apparent from the following detailed description considered with the reference to the accompanying drawings, wherein:

FIG. 10 is an explanatory view of a table defining events to make the buzzer operate and the order of priority.

DETAILED DESCRIPTION

An embodiment of a seat apparatus for a vehicle will hereunder be explained with the drawings.

Figure 1:
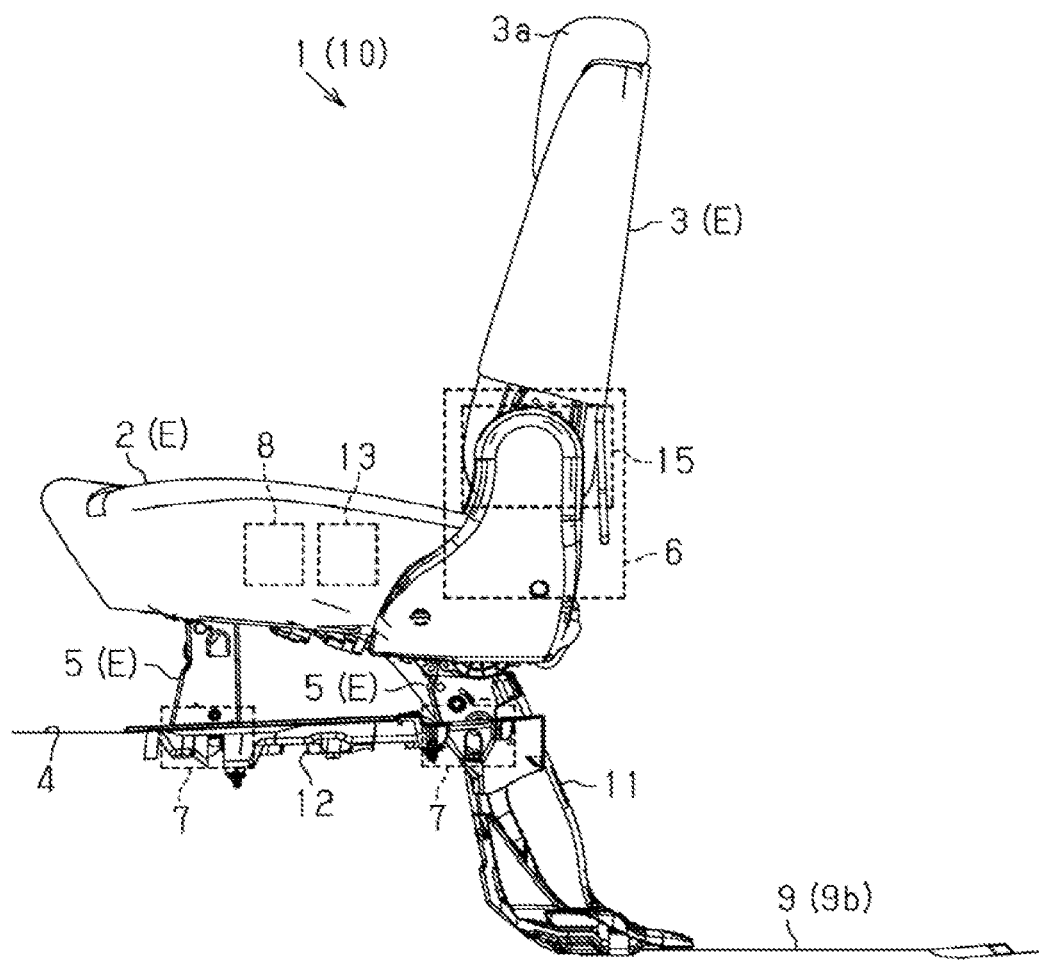
FIG. 1 is a side view of a retractable seat according to an embodiment disclosed here.
Figure 2:
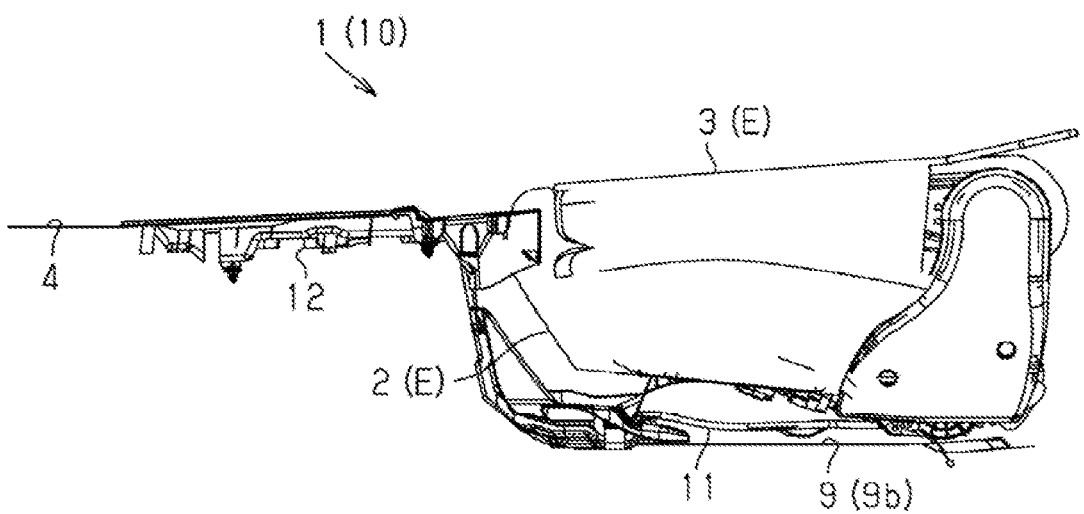
FIG. 2 is another side view of the retractable seat.

As shown in FIGS. 1 and 2, a seat 1 for a vehicle includes a seat cushion 2 and a seatback 3 provided at a rear end portion of the seat cushion 2. The seat 1 of the embodiment includes seat legs 5, 5 at the lower of the seat cushion 2, the seat legs 5, 5 supporting the seat cushion 2 on a vehicle floor 4. A headrest 3a is provided at a top portion of the seatback 3. A reclining apparatus 6 which adjusts the reclining angle of the seatback 3 with respect to the seat cushion 2 by using a motor as a drive source is arranged between the seat cushion 2 and the seatback 3.

The seat 1 of the embodiment includes lock devices 7, 7 configured to lock and unlock the seat 1 with respect to the vehicle floor 4 are provided at bottoms of the seat legs 5, 5, respectively. Specifically, the lock devices 7, 7 each includes a known configuration provided with a latch mechanism which is held and released with respect to a striker. The lock devices 7, 7 are unlocked by the operation of a lock actuator 8 using the motor as the drive source. Thus, the seat 1 of the embodiment includes a configuration as a retractable seat 10 in which the seat 1 is retracted in a folded state in a storage recessed portion 9 provided at the vehicle floor 4 based on the function of the lock devices 7, 7.

Specifically, the seat 1 of the embodiment includes a rotary link 11 rotatably connected to a bottom portion 9b of the storage recessed portion 9 and the seat cushion 2. The storage recessed portion 9 of the embodiment is formed at the rear of the vehicle (right in FIGS. 1 and 2) with respect to a seat extension portion 12 specified or defined on the vehicle floor 4. The rotary link 11 includes a first end which is connected to a rear end of the seat cushion 2 and a second end which is connected to the bottom portion 9b of the storage recessed portion 9, more specifically, to a front end thereof.

The seat 1 of the embodiment includes a link actuator 13 inside the seat cushion 2, the link actuator 13 operating the rotary link 11 using the motor as the drive source. The reclining device 6 provided between the seat cushion 2 and the seatback 3 includes a forward-tilting mechanism 15 tilting the seatback 3 forward by releasing the tilt lock thereof. The seat 1 of the embodiment is configured such that the seat cushion 2 moves between the seat extension portion 12 and the storage recessed portion 9 by the rotation of the rotary link 11 based on the drive power of the link actuator 13.

In particular, when the seat cushion 2 moves in the storage recessed portion 9, the seat legs 5, 5 of the seat 1 of the embodiment are folded and stored inside the seat cushion 2 in a state in which each of base ends thereof rotates. The seatback 3 is folded on the seat cushion 2 by the operation of the forward-tilting mechanism 15 provided at the reclining device 6. The seat 1 of the embodiment is configured such that a component E thereof is retracted in the storage recessed portion 9.

Figure 3:
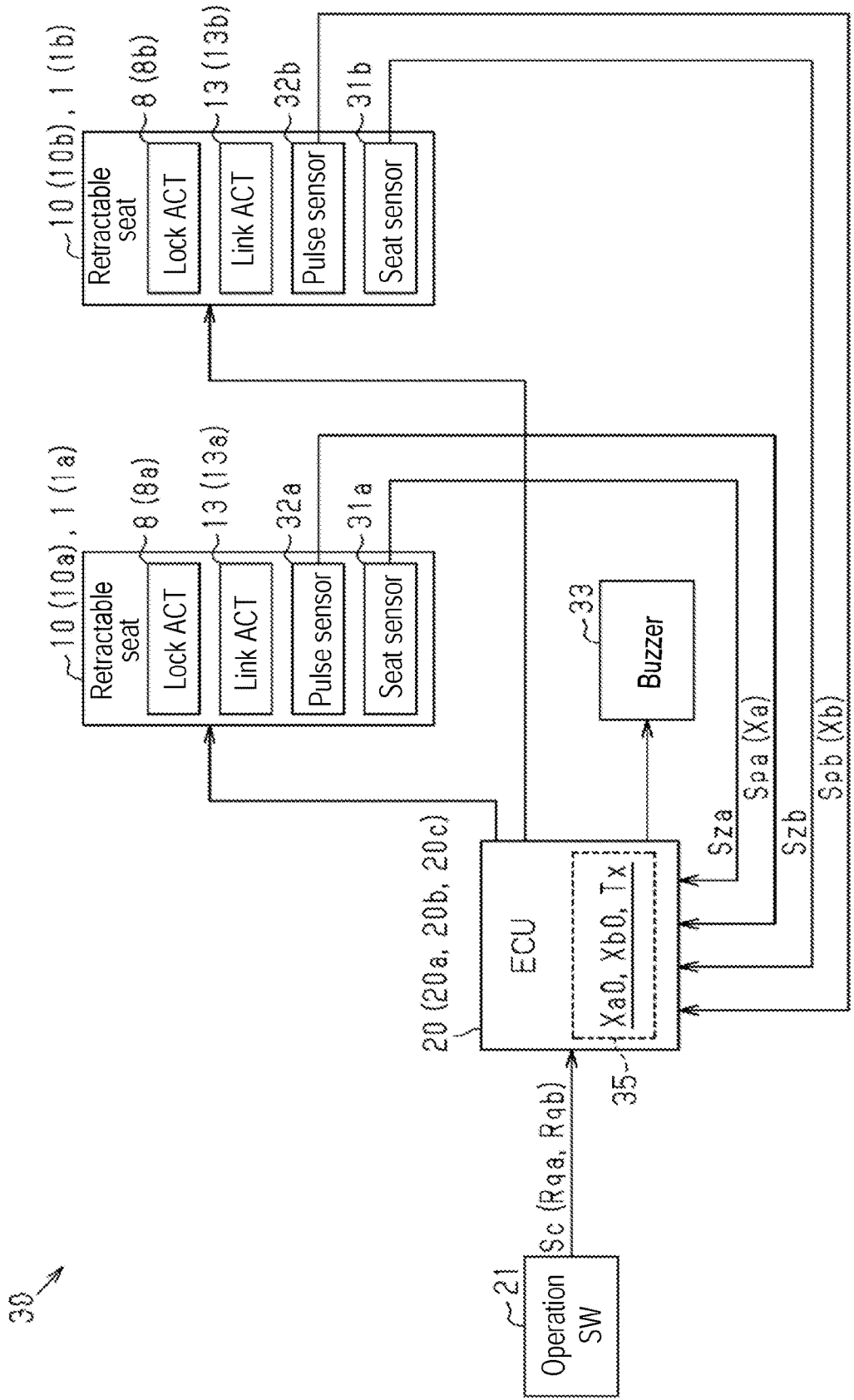
FIG. 3 is a block diagram illustrating a schematic configuration of a seat apparatus.

As shown in FIG. 3, the vehicle on which the seats 1 of the aforementioned configuration are mounted is provided with an electronic control unit 20, or an ECU 20 controlling the operation of the lock actuator 8 and the link actuator 13 provided at the seat 1. The ECU 20 is inputted with an operation input signal Sc with respect to an operation switch 21 provided at the seat 1, a vehicle component, or a mobile device held by the user of the vehicle. That is, the ECU 20 of the embodiment controls the operation of the lock actuator 8 and the link actuator 13 in response to an operation request indicated by the operation input signal Sc. The seat apparatus 30 of the embodiment is configured to extend and retract the seat 1 including the configuration as the retractable seat 10 by the driving the motor.

More specifically, the seat apparatus 30 of the embodiment includes the ECU 20 which individually controls the operation of a first lock actuator 8a, a second lock actuator 8b, a first link actuator 13a, and a second link actuator 13b of the pair of right-left retractable seats 10a, 10b (a first retractable seat 10a and a second retractable seat 10b) configuring a first seat 1a and a second seat 1b of the vehicle.

In particular, the ECU 20 of the seat apparatus 30 of the embodiment detects individually the seated state of the passengers seated on the first and second retractable seats 10a, 10b based on a first output signal Sza and a second output signal Szb of a first seat sensor 31a and a second seat sensor 31b provided at the first and second retractable seats 10a, 10b, respectively. The ECU 20 individually receives a first operation request Rqa and a second operation request Rqb of the first and second retractable seats 10a, 10b, respectively, indicated by the operation input signal Sc. The ECU 20 is inputted with a first pulse signal Spa and a second pulse signal Spb, synchronized with the operation of the link actuator 13, outputted by the first and second pulse sensors 32a, 32b provided at the first and second retractable seats 10a, 10b. The ECU 20 of the embodiment is configured to individually detect a first operation position Xa and a second operation position Xb of the first and second retractable seats 10a, 10b moving between the seat extension portion 12 and the storage recessed portion 9 specified at the vehicle floor 4 by counting the first and second pulse signals Spa, Spb.

The ECU 20 of the embodiment individually stores or memorizes a first original position Xa0 and a second original position Xb0 of the first and second retractable seats 10a, 10b, respectively, in a storage area 35. The ECU 20 individually detects any catches or insertions at the first and second retractable seats 10a, 10b in response to the change of the first and second signals Spa, Spb, respectively. The ECU 20 of the embodiment thus controls the first and second seats 10a, 10b individually to be extended and retracted.

For convenience of description, the operation control of the first seat 1a and the second seat 1b including the configuration as the first and second retractable seats 10a, 10b shall indicate either the extending control extending the component E such as the seat cushion 2, the seatback 3, and the seat legs 5 on the vehicle floor 4, or the retracting control retracting them in the storage recessed portion 9.

More specifically, the seat apparatus 30 of the embodiment includes a buzzer 33 operating notification output by buzzer sound for the users of the first and second retractable seats 10a, 10b. The buzzer 33 of the seat apparatus 30 of the embodiment is controlled by the ECU 20.

In particular, the ECU 20 of the embodiment notifies or informs the start and the end of the operation control of the first seat 1a and the second seat 1b including the configuration as the first and second retractable seats 10a, 10b by operating the notification control of the buzzer 33. The ECU 20 of the embodiment operates the notification control of the buzzer 33 in a case where any catches or insertions of the first and second seats 1a, 1b are detected, in a case where the first and second seats 1a, 1b each is arranged at a seat prohibition position, or in a case where the ECU 20 does not learn the first and second original positions Xa0, Xb0.

The first and second seats 1a, 1b of the seat apparatus 30 of the embodiment shares the single buzzer 33. The buzzer 33 of the seat apparatus 30 of the embodiment is arranged integrally with the ECU 20. The ECU 20 of the embodiment is configured to operate the notification output by buzzer sound by using the buzzer 33 in a case where the events described above occur at either the first seat 1a or the second seat 1b.

The notification control of the buzzer 33 controlled by the ECU 20 of the embodiment will hereunder be explained.

The ECU 20 of the embodiment determines whether the notification controls of the buzzer 33 supporting each of the events are duplicated in a case where the plural events described above making the buzzer 33 operate occur. In a case where the plural notification controls are duplicated, one of the duplicated, plural notification controls is configured to operate prior to the other(s).

Figure 4:
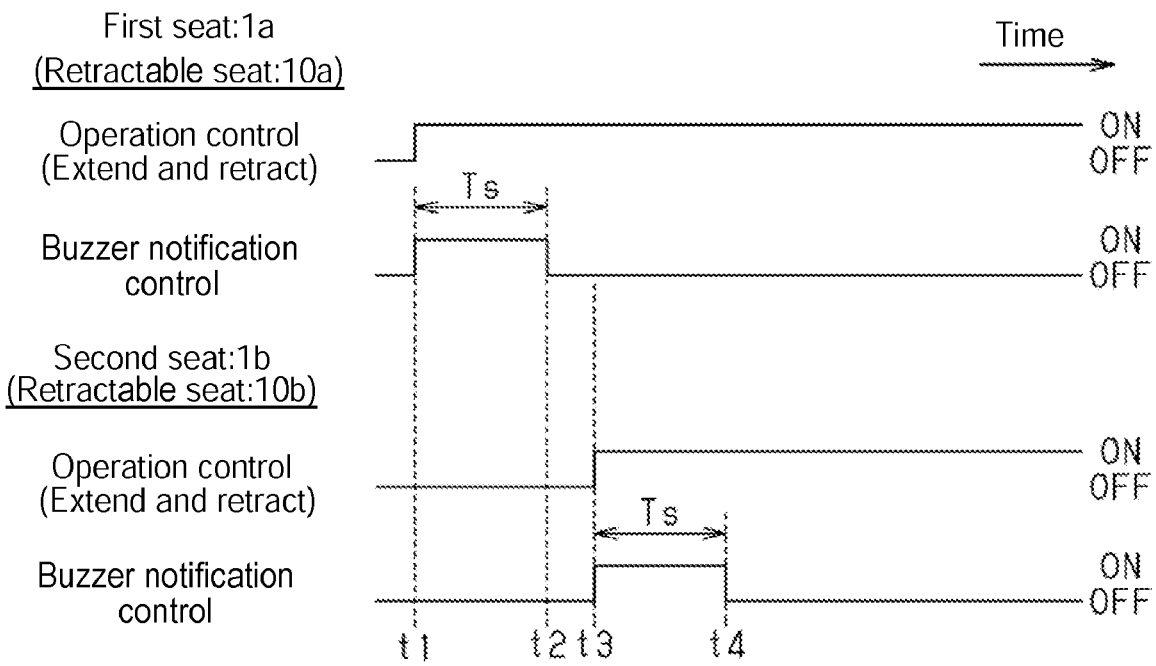
FIG. 4 is a time chart illustrating an example of the notification control of a buzzer indicating the start of the operation of the retractable seat.

In particular, for example, according to an example shown in FIG. 4, when the operation control of the first seat 1a starts (a time t1), the operation control of the second seat 1b is not performed. In this case, the ECU 20 starts the notification control of the buzzer 33 indicating the start of the operation control of the first seat 1a in accordance with the timing when the operation control of the first seat 1a starts. In this case, a notification time Ts of the buzzer 33 of the seat apparatus 30 of the embodiment, that is, the notification time Ts of a so-called operation start buzzer is specified or set at a predetermined time. The ECU 20 of the embodiment ends the notification control of the buzzer 33 at a time point in which the notification time Ts has passed (a time t2).

In the example shown in FIG. 4, the operation control of the second seat 1b starts (a time t3) after the end point in which the notification control notifying the start of the operation control of the first seat 1a is terminated (the time t2). That is, in the example, the buzzer 33 does not operate at a time point in which the operation control of the second seat 2b starts. The ECU 20 of the embodiment starts the notification control of the buzzer 33 indicating the start of the operation control of the second seat 1b in accordance with the timing when the operation control of the second seat 1b starts.

Figure 5:
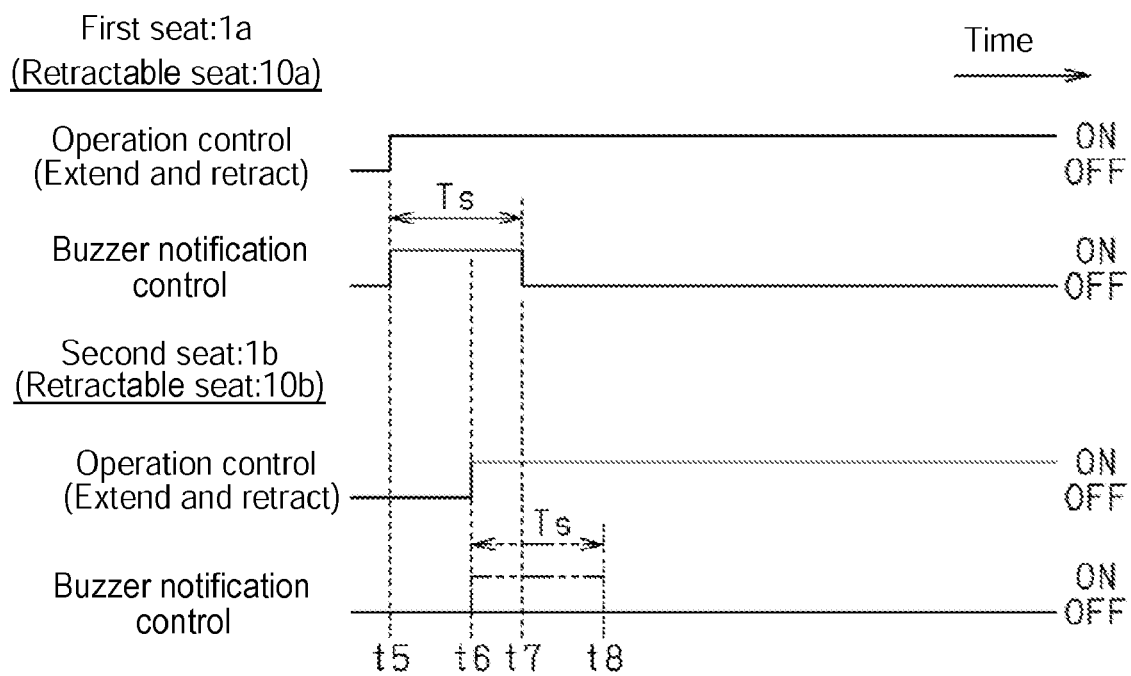
FIG. 5 is a time chart illustrating another example of the notification control of the buzzer indicating the start of the operation of the retractable seat.

Meanwhile, as shown in an example of FIG. 5, the operation control of the second seat 1b starts (a time t6)

before a time point in which the notification time Ts of the operation start buzzer has passed (a time t7) from a time point in which the operation control of the first seat 1a starts (a time t5). That is, in the example, the operation control of the second seat 1b starts during the notification control of the buzzer 33 indicating the start of the operation control of the first seat 1a. In this case, the ECU 20 of the embodiment is configured to prioritize the notification control of the buzzer 33 indicating the start of the operation control of the preceding first seat 1a. For the convenience of explanation, a seat in which the operation control is performed precedently is referred to as a preceding seat, and a seat in which the operation control is performed followingly is referred to as a following seat.

In particular, the preceding first seat 1a of the ECU 20 of the embodiment operates the notification control of the buzzer 33 for the predetermined notification time Ts from the start of the operation control. Meanwhile, the ECU 20 does not operate the notification control of the buzzer 33 indicating the start of the operation control of the following second seat 1b of which the operation control starts during the notification of the operation starting buzzer with respect to the preceding first seat 1a. On the contrary to the example shown in FIG. 5, in a case where the second seat 1b is preceded, and the first seat 1a follows thereafter, the notification control of the buzzer 33 indicating the start of the operation control of the preceding second seat 1b is prioritized. Accordingly, in a case where the operation controls of the first and second seats 1a, 1b start in close timing, the seat apparatus 30 of the embodiment may efficiently operate the notification output indicating the start of the operation control by the operation of the buzzer 33.

Figure 6:
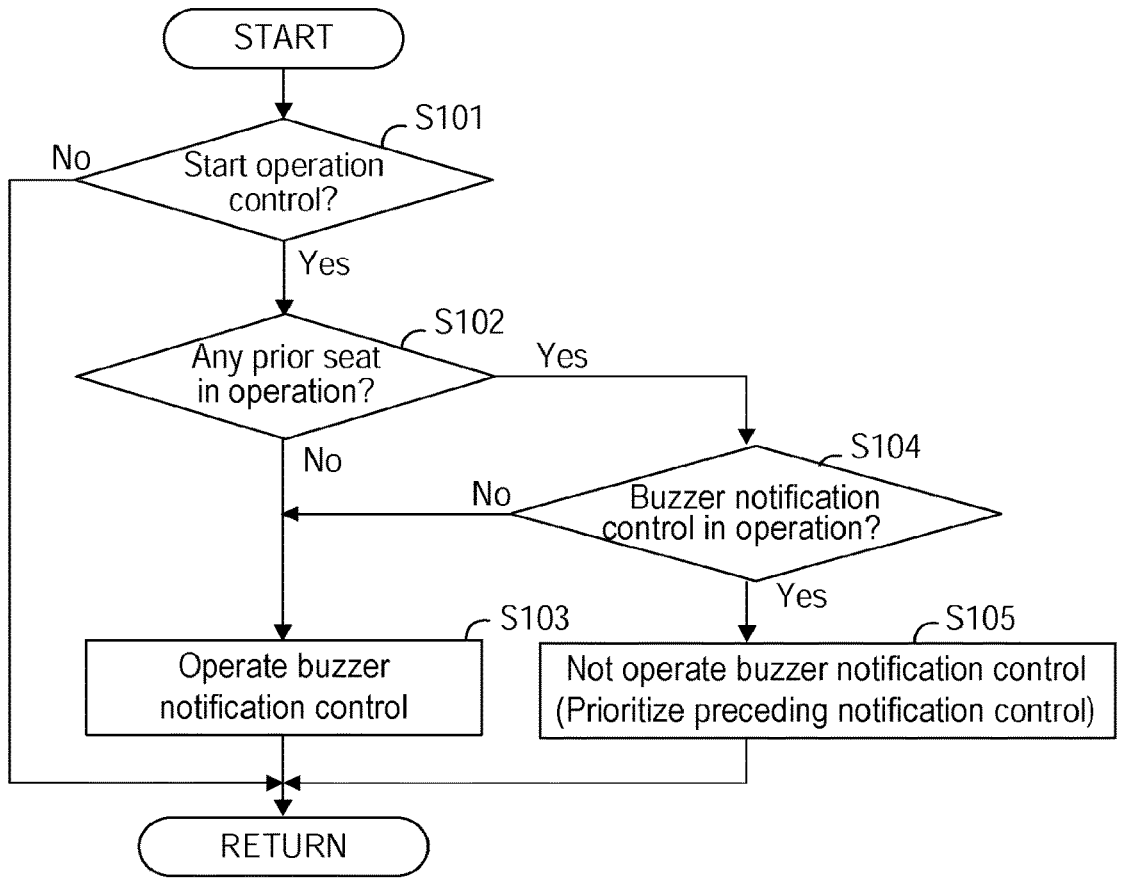
FIG. 6 is a flowchart illustrating a process of the notification control notifying the start of the operation control.

That is, as shown in a flowchart in FIG. 6, in a case where the operation control starts for one of the first and second seats 1a, 1b (Step S101), the ECU 20 of the embodiment determines whether there is the preceding seat 1 in operation, that is, whether the other of the seats 1 is in operation (Step S102). In a case where there is no preceding seat 1 (Step S102: NO), the ECU 20 of the embodiment operates the notification control of the buzzer 33 indicating the start of the operation control of the seat 1 of which the new operation control starts (Step S103).

In a case of determining that there is the preceding seat 1 (the seat 1 which is in operation) in Step S102, (Step S102: YES), the ECU 20 of the embodiment then determines whether the notification control of the buzzer 33 indicating the start of the operation control of the preceding seat 1 is in operation (Step S104). In a case where the notification control is not in operation, that is, in a case of determining that the notification control of the buzzer 33 indicating the start of the operation control for the preceding seat 1 has already ended (Step S104: NO), the ECU 20 operates the notification control of the buzzer 33 indicating the start of the operation control of the following seat 1 of which the operation control newly starts (Step S103).

Meanwhile, in a case of determining that the notification control of the buzzer 33 indicating the start of the operation control of the preceding seat 1 is in operation (Step S104: YES), the ECU 20 does not operate the notification control of the buzzer 33 indicating the start of the operation control of the following seat 1 (Step S105). Accordingly, the ECU 20 of the embodiment prioritizes the notification control of the buzzer 33 indicating the start of the operation control of the preceding seat 1.

Figure 7:
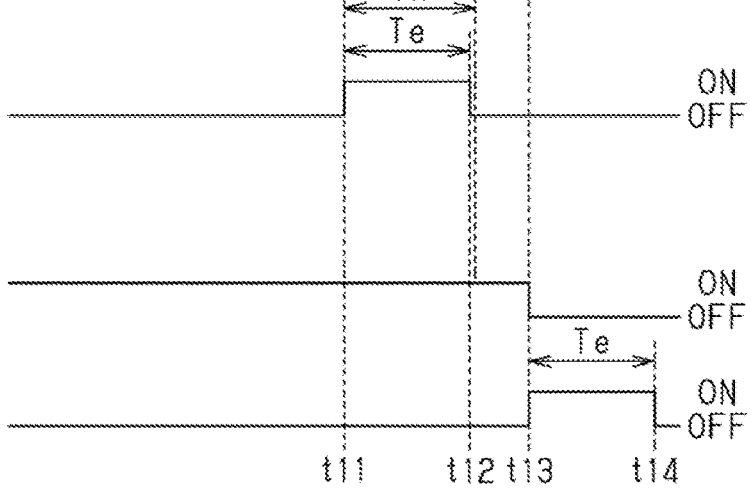
FIG. 7 is a time chart illustrating an example of the notification control of the buzzer indicating the end of the operation of the retractable seat.

More specifically, for example, in an example in FIG. 7, when the operation control of the first seat 1a ends (a time t11), the second seat 1b is in operation control. Further, in the example, the operation control of the second seat 1b ends (a time t13) after a time point in which the notification control of the buzzer 33 indicating the end of the operation control of the first seat 1a ends (a time t12). In the seat apparatus 30 of the embodiment, a predetermined time is specified or set for a notification time Te of the buzzer 33 indicating the end of the operation control, that is, the notification time Te of a so-called operation end buzzer. The notification control of the buzzer 33 indicating the end of the operation control of the following second seat 1b operates for the predetermined notification time Te, as operating in the preceding first seat 1a.

Figure 8:
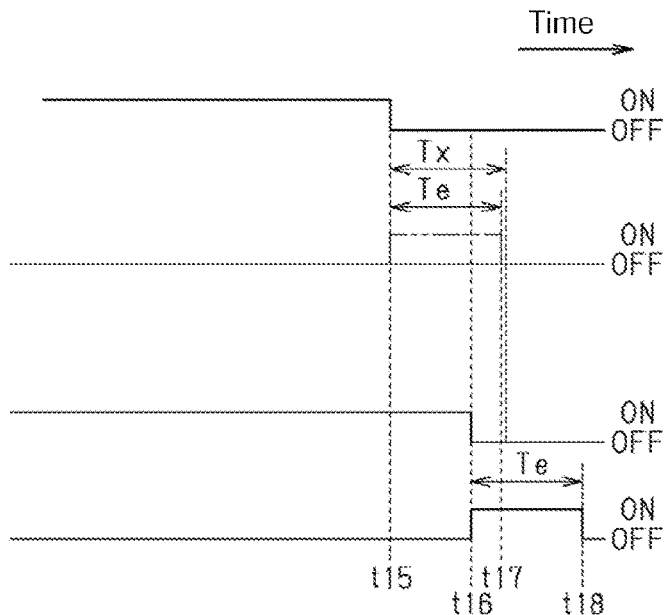
FIG. 8 is a time chart illustrating another example of the notification control of the buzzer indicating the end of the operation of the retractable seat.

Meanwhile, as shown in an example in FIG. 8, each of the operation controls for the first seat 1a and the second seat 1b ends by a shorter interval than the notification time Te of the operation end buzzer. Specifically, the operation control of the following second seat 1b ends (a time t16) before a time point in which the notification control of the buzzer 33 indicating the end of the operation control of the preceding first seat 1a (a time t17) is supposed to operate. In this case, the ECU 20 of the embodiment is configured to prioritize the notification control of the buzzer 33 indicating the end of the operation control of the following second seat 1b.

Specifically, the ECU 20 of the embodiment stores a duplication determination time Tx to the storage area 35, the duplication determination time Tx which is longer than the notification time Te precedently specified based on the notification time Te of the operation end buzzer (see FIG. 3). The duplication determination time Tx of the seat apparatus 30 of the embodiment is set slightly longer than the notification time Te of the operation end buzzer. In a case of ending the operation control of the preceding first seat 1a, the ECU 20 of the embodiment estimates the end timing of the operation control of the following second seat 1b (the time t16) based on the operation position Xb thereof. In a case of estimating that the operation control of the following second seat 1b ends before the aforementioned duplication determination time Tx has passed from the time point in which the operation control of the preceding first seat 1a ended (the time t15), the ECU 20 of the embodiment is configured not to operate the notification control of the buzzer 33 indicating the end of the operation control of the preceding first seat 1a.

That is, in this case, the ECU 20 of the embodiment operates the notification control of the buzzer 33 indicating the end of the operation control only for the following second seat 1b. On the contrary to the example shown in FIG. 8, in a case where the second seat 1b is preceded and the first seat 1a is followed thereby, the ECU 20 prioritizes the notification control of the buzzer 33 indicating the end of the operation control of the following first seat 1a. The seat apparatus 30 of the embodiment may efficiently operate the notification output indicating the end of the operation control by the operation of the buzzer 33 even in a case where the operation controls of the first and second seats 1a, 1b end in close timing.

Figure 9:
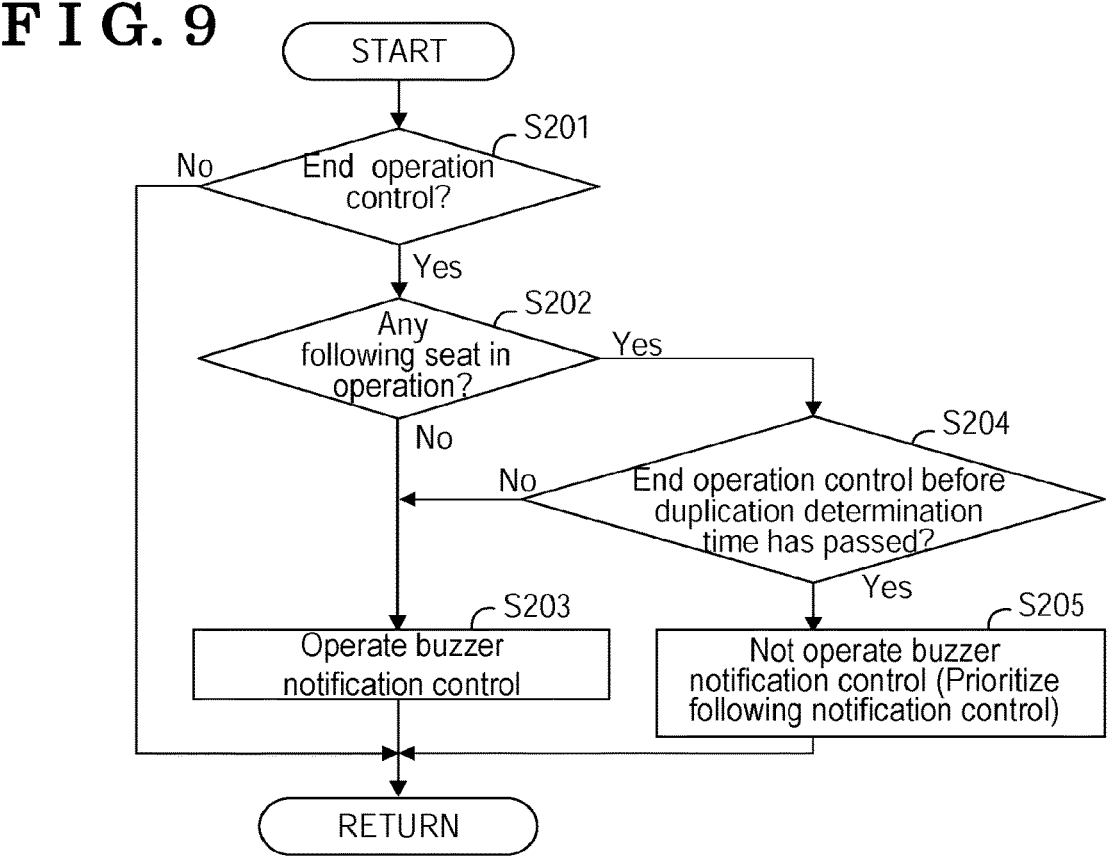
FIG. 9 is a flowchart illustrating a process of the notification control notifying the end of the operation control.

That is, as shown in a flowchart in FIG. 9, in a case where the operation control of one of the first seat 1a and the second seat 1b ends (Step S201), the ECU 20 of the embodiment firstly determines whether there is the following seat 1 which is in operation, that is, whether the other of the seats 1 is in operation or not (Step S202). In a case of determining that there is no following seat 1 which is in operation (Step S202: NO), the ECU 20 of the embodiment operates the notification control of the buzzer 33 indicating the end of the operation control of the seat 1 of which the operation control ends (Step S203).

In a case of determining that there is the following seat 1 which is in operation in Step S202 (Step S202: YES), The ECU 20 of the embodiment then estimates whether the operation control of the following seat 1 ends before the aforementioned duplication determination time Tx has passed (Step S204). In a case of estimating that the operation control of the following seat 1 does not end before the duplication determination time Tx has passed (Step S204: NO), the ECU 20 operates the notification control of the buzzer 33 indicating the end of the operation control of the seat 1 of which the operation control ends precedently (Step S203).

Meanwhile, in a case of estimating that the operation control of the following seat 1 ends before the duplication determination time Tx has passed, (Step S204: YES), the ECU 20 does not operate the notification control of the buzzer 33 indicating the end of the operation control of the seat 1 of which the operation control ends precedently (Step S205). Accordingly, the ECU 20 of the embodiment is configured to prioritize the notification control of the buzzer 33 indicating the end of the operation control of the following seat 1.

As shown in FIG. 10, the storage area 35 of the ECU 20 of the embodiment stores a table 40 defining the events making the buzzer 33 operate and the priority thereof. Specifically, the priority of the catch detection buzzer is the highest in the seat apparatus 30 of the embodiment. The order of priority of a seat prohibition position buzzer, an original position unlearned buzzer, the operation start buzzer, the operation end buzzer, and an operation condition failure buzzer are set in the aforementioned order. The ECU 20 of the embodiment is configured to store the relationship between each of the events and the priority thereof in the table 40.

That is, the ECU 20 of the embodiment controls the buzzer 33 to operate in a case where the events defined in the table 40 are detected. In a case where different types of the events occur duplicately, the ECU 20 is configured to prioritize and operate the notification control of the buzzer 33 for the event having a high priority.

Specifically, the ECU 20 of the embodiment operates the notification control of the buzzer 33 for the event having the highest priority among the events occurring duplicately, and does not operate the notification control of the buzzer 33 for the other event(s). The catch detection buzzer of the seat apparatus 30 of the embodiment operates in a continuous manner from a reverse operation buzzer which operates after the catch detection buzzer. Therefore, the seat apparatus 30 of the embodiment may efficiently operate the notification output by the operation of the buzzer 33 for the event having a high priority.

The action of the embodiment will hereunder be explained.

In a case where the notification controls of the buzzer 33 of the seat apparatus 30 of the embodiment indicating the start of the operation control of the first and second seats 1*a*, 1*b* duplicately operate, the notification control of the buzzer 33 of the preceding seat 1 is prioritized. In a case where the notification controls of the buzzer 33 indicating the end of the operation control duplicately operate, the notification control of the buzzer 33 of the following seat 1 is prioritized. Accordingly, in a case where the operation controls of the first and second seats 1*a*, 1*b* start and end in close timing, the start and the end of the operation control may be effectively notified by the operation of the buzzer 33.

According to the aforementioned embodiments, the following effects and advantages may be attained.

(1) The ECU 20 of the seat apparatus 30 for the vehicle includes a function as an event detection unit 20*a* for each of the plural seats 1 which share the buzzer 33, the event detection unit 20*a* configured to detect the occurrence of the event making the buzzer 33 operate. The ECU 20 includes another function as a notification control unit 20*b* configured to operate the notification control of the buzzer 33 in accordance with the detected event. In a case where there are the plural seats 1 in which the event making the buzzer 33 operate occurs, the ECU 20 prioritizes and operates one of the plural notification controls which duplicately operate.

According to the aforementioned configuration, the seat apparatus 30 efficiently notify the occurrence of the event of which notification control is prioritized by the operation of the buzzer 33.

(2) The ECU 20 detects the start of the operation control of the component E of the seat 1 as the event making the buzzer 33 operate. In a case where there are the plural seats 1 of which the operation control of the component E starts, the ECU 20 determines whether the notification controls of the buzzer 33 notifying the start of the operation control of the seat 1 operate duplicately. In a case of determining that the notification controls of the buzzer 33 duplicately operate, the ECU 20 prioritizes and operates the notification control of the buzzer 33 indicating the start of the operation control of the seat 1 of which the operation control starts first.

According to the aforementioned configuration, the start of the operation control of the seat 1 may efficiently be notified by the buzzer 33 even in a case where the operation controls of the plural seats 1 start in close timing.

(3) In a case where there is the following seat 1 in which the operation control of the component E starts during the notification control of the buzzer 33 indicating the start of the operation control of the component E for one of the seats 1, the ECU 20 does not operate the notification control of the buzzer 33 indicating the start of the operation control of the following seat 1.

Accordingly, the buzzer indicating the start of the operation control may operate at an appropriate timing without making the users feel uncomfortable.

(4) The ECU 20 detects the end of the operation control of the component E of the seat 1 as the event that makes the buzzer 33 operate. In a case where there are the plural seats 1 ending the operation control, the ECU 20 determines whether the notification controls of the buzzer 33 notifying the end of the operation control of the seats 1 operate duplicately. In a case of determining the duplication of the notification control of the buzzer 33, the ECU 20 prioritizes and operates the notification control of the buzzer 33 indicating the end of the operation control of the seat 1 of which the operation control ends lastly.

According to the aforementioned configuration, the end of the operation controls of the plural seats 1 may be notified efficiently by the operation of the buzzer 33 even in a case where the operation controls of the plural seats 1 end in close timing.

(5) In a case of detecting the end of the operation control of the component E of one of the seats 1, the ECU 20 determines whether there is the following seat 1 of which the operation control is assumed to end before the duplication determination time Tx, set or specified longer than the notification time Te of the buzzer 33 indicating the end of the operation control, has passed.

In a case where there is the following seat 1 satisfying the aforementioned condition, the ECU 20 does not operate the notification control of the buzzer 33 indicating the end of the operation control of the preceding seat 1 of which the end of the operation control is detected.

Accordingly, the buzzer indicating the end of the operation control may operate at an appropriate timing without making the users feel uncomfortable.

(6) The seat 1 is configured as the retractable seat 10 in which the seat cushion 2, the seatback 3, and the seat legs 5 as the component E are retracted in the folded state in the storage recessed portion 9 provided at the vehicle floor 4. The ECU 20 operates the extending control extending the component E of the seat 1 retracted in the storage recessed portion 9 on the vehicle floor 4, and the retracting control retracting the component E of the seat 1 extended on the vehicle floor 4 in the storage recessed portion 9.

That is, by adopting (2) to (5) of the aforementioned description, the buzzer 33 may effectively notify the start and end of the extending control and the retracting control of the plural retractable seats 10.

(7) The ECU 20 includes the function as a priority storage unit 20c configured to store the priority for each of the plural kinds of events making the buzzer 33 operate. In a case where the different types of events occur duplicately, the ECU 20 prioritizes and operates the notification control of the buzzer 33 for the event having the higher priority than the other event(s).

Accordingly, the seat apparatus 30 may operate the notification output by the operation of the buzzer 33 more efficiently for the event having a higher priority.

(8) The ECU 20 operates the notification control of the buzzer 33 for the event having the highest priority among the events occurred duplicately and does not operate the notification control of the buzzer 33 for the other event(s).

Accordingly, the seat apparatus 30 may operate the notification output by the operation of the buzzer 33 more efficiently for the event having a higher priority.

The aforementioned embodiment may be modified as below.

In the aforementioned embodiment, the ECU 20 does not operate the notification control of the buzzer 33 indicating the start of the operation control of the following seat 1 of which the operation control starts during the notification control of the buzzer 33 indicating the start of the operation for the preceding seat 1. Alternately, the ECU 20 may set the duplication determination time which is longer than the notification time of the buzzer 33 indicating the start of the operation control of the preceding seat 1, and may not operate the notification control of the buzzer 33 indicating the start of the operation control of the following seat 1 of which the operation control starts during the aforementioned duplication determination time.

That is, in a case where there is the following seat 1 of which the operation control starts before the predetermined time, set longer than the notification time of the buzzer 33 indicating the start of the notification control, has passed after the notification control of the buzzer 33 indicating the start of the operation control of one of the seats 1, the ECU 20 does not operate the notification control indicating the start of the operation control of the following seat 1.

According to this configuration, the ECU 20 may effectively notify the start of the operation control by inhibiting the duplication of the buzzer sound for the preceding seat 1 and for the following seat 1.

In the aforementioned embodiment, the seat apparatus 30 for the vehicle includes the right-left pair of the retractable seats 10a, 10b as the first seat 1a and the second seat 1b. Furthermore, the ECU 20 operates the extending control extending the seat cushion 2, the seatback 3, and the seat legs 5 retracted in the storage recessed portion 9 on the vehicle floor 4 and the retracting control retracting the component E in the storage recessed portion 9 as the operation control of the component E. In a case where the notification controls of the buzzer 33 notifying the start and the end of the operation control duplicately operate, one of the duplicating plural notification controls is prioritized and operated.

Alternately, the single buzzer 33 may be shared by three and more seats 1 including the configuration as the retractable seat 10. The ECU 20 may be configured to control one of the extending control on the vehicle floor 4 and the retracting control to the storage recessed portion by the drive of the motor. The component E extended or retracted by the operation control may be freely combined other than the combination of the seat cushion 2, the seatback 3 and the seat legs 5.

In addition, for example, the disclosure is applicable to the operation control other than the extension and retraction of the retractable seat 10, for example the seat sliding control or the seat reclining control, as long as the buzzer 33 shared by the plural seats 1 operates when the operation control of the component E starts and ends. Furthermore, for example, the operation control may be applied to the component E which is not exemplified in the aforementioned seat 1 of the embodiment, for example, an ottoman or a side arm.

In the configuration in which the operation controls of plural types operate for the component E of the seats 1, the ECU 20 may determine whether the notification controls of the buzzer 33 operate duplicately, and prioritize and operate one of the plural notification controls which operate duplicately. The operation control of the retractable seat 10 may include the configuration in which the extending control and retracting control are distinguished, or the extending control and the retracting control may be regarded as the same type of operation control.

The contents of the events making the buzzer 33 operate and the priority of the events may be freely changed. In a case where there are plural on-vehicle devices sharing the buzzer 33, the subject or target may be extended other than the seat 1. For example, in the configuration in which the buzzer 33 is shared by a wind regulator device and a sunroof device, one of the notification controls operating duplicately may be prioritized in a case where the notification controls of the buzzer 33 operate duplicately. In this kind of notification device for the vehicle, the types of the in-vehicle devices sharing the buzzer 33 may be freely specified.

According to the aforementioned embodiment, the ECU 20 operates the prioritized notification control of the buzzer 33 and does not operate the other notification control(s). Alternately, the method for prioritizing the notification control may be freely changed. For example, the sound of the buzzer may be lowered for the notification control which is not prioritized so that the prioritized operation control of the buzzer 33 may be prominent or stood out.

According to the aforementioned configuration, the occurrence of the event of which the operation control is prioritized may be effectively notified by the operation of the buzzer 33.

The technological thoughts and effects attained by the aforementioned embodiment and the modified examples are hereunder be explained.

(i) A seat apparatus for a vehicle includes a notification control unit which operates the notification control for an event having the highest priority among the events occurring duplicately, and does not operate the notification control for the other event(s) occurring duplicately.

Accordingly, the seat apparatus for the vehicle may operate the notification output by the operation of the buzzer more efficiently for the event having a high priority.

(ii) A seat apparatus for a vehicle includes a notification control unit which is configured not to operate a notification control indicating a start of an operation control of a following seat in a case where there is the following seat of which the operation control starts before a predetermined time which is set longer than a notification time of a buzzer indicating the start of the notification control has passed after the notification control of the buzzer indicating the start of the operation control of one of the seats.

According to the aforementioned embodiment, the seat apparatus (30) for the vehicle includes the event detection unit (20a) configured to detect the occurrence of the event making the buzzer (33) operate for each of the plural seats (1) sharing the buzzer (33), and the notification control unit (20b) configured to operate notification control of the buzzer (33) in accordance with the event. The notification control unit (20b) is configured to prioritize and operate one of the plural notification controls which operate duplicately in a case where there are the plural seats (1) in which the event occurs.

According to the aforementioned configuration, the occurrence of the event of which the operation of the notification control is prioritized may be effectively notified by the operation of the buzzer 33.

According to the aforementioned embodiment, the event detection unit (20a) is configured to detect the start of the operation control of the component E included in each of the plural seats (1) as the event. In a case where there are the plural seats (1) starting the operation control, the notification control unit (20b) is configured to prioritize and operate the notification control indicating the start of the operation control of the seat (1) of which the operation control starts first among the plural notification controls which operate duplicately to notify the start of the operation control of each of the plural seats (1).

According to the aforementioned configuration, in a case where the operation controls of the first and second seats 1a, 1b start in close timing, the seat apparatus 30 of the embodiment may efficiently operate the notification output indicating the start of the operation control by the notification of the buzzer 33.

According to the aforementioned embodiment, in a case where there is the seat (1) of which the operation control starts followingly during the notification control indicating the start of the operation control of one of the plural seats (1), the notification control unit is configured not to operate the notification control indicating the start of the operation control of the seat (1) of which the operation control starts followingly.

According to the aforementioned configuration, the buzzer indicating the start of the operation control may operate at an appropriate timing without making the users feel uncomfortable.

According to the aforementioned embodiment, the event detection unit (20a) is configured to detect the end of the operation control of the component (E) included in each of the plural seats (1) as the event. In a case where there are the plural seats (1) ending the operation control, the notification control unit (20b) is configured to prioritize and operate the notification control indicating the end of the operation control of the seat (1) of which the operation control ends lastly among the plural notification controls which operate duplicately to notify the end of the operation control of each of the plural seats (1).

According to the aforementioned configuration, in a case where the operation controls of the first and second seats 1a, 1b end in close timing, the seat apparatus 30 of the embodiment may efficiently operate the notification output indicating the end of the operation control by the notification of the buzzer 33.

According to the aforementioned embodiment, in a case where the end of the operation control operated in one of the plural seats (1) is detected, and in a case where there is the seat (1) of which the operation control is estimated to end followingly before the duplication determination time (Tx) which is set longer than the notification time (Te) of the buzzer (33) indicating the end of the operation control has passed, the notification control unit (20b) is configured not to operate the notification control indicating the end of the operation control of the seat (1) of which the end of the operation control is detected prior to the operation control of the other seat (1).

According to the aforementioned configuration, the buzzer indicating the end of the operation control may operate at an appropriate timing without making the users feel uncomfortable.

According to the aforementioned embodiment, each of the plural seats (1) is a retractable seat in which the component (E) is retracted in the folded state in a storage recessed portion (9) provided at the vehicle floor (4), and the operation control is at least one of the extending control extending the component (E) retracted in the storage recessed portion (9) on the vehicle floor (4), and the retracting control retracting the component (E) extended on the vehicle floor (4) in the storage recessed portion (9).

According to the aforementioned configuration, the buzzer 33 may effectively notify the start and the end of the extending control and the retracting control of the plural retractable seats 10.

According to the aforementioned embodiment, the seat apparatus (30) for the vehicle further includes the priority storage unit (20c) configured to store the priority for each of the events which include the plural types and are detected by the event detection unit (20a). The notification control unit (20b) is configured to prioritize and operate the notification control for one event having a higher priority than the other event in a case where different types of events occur duplicately.

According to the aforementioned configuration, the seat apparatus 30 may operate the notification output by the operation of the buzzer 33 more efficiently for the event having a higher priority.

The notification control unit (20b) is configured to operate the notification control for one event having the highest priority among the events occurring duplicately, and does not operate the notification control for the other event occurring duplicately.

Accordingly, the seat apparatus for the vehicle may operate the notification output by the operation of the buzzer more efficiently.

The notification control unit (20b) is configured not to operate the notification control indicating the start of the operation control of the seat (1) of which the operation control starts followingly in a case where there is the seat (1) of which the operation control starts followingly before the predetermined time which is set longer than the notification time (Te) of the buzzer indicating the start of the notification control has passed after the notification control of the buzzer (33) indicating the start of the operation control of one of the plural seats (1) starts.

Accordingly, the seat apparatus for the vehicle may operate the notification output by the operation of the buzzer more efficiently.

The notification device (33) for the vehicle includes the event detection unit (20a) configured to detect the occurrence of the event making the buzzer (33) operate for each of the plural in-vehicle devices sharing the buzzer (33), and the notification control unit (20b) configured to operate notification control of the buzzer (33) in accordance with the event. The notification control unit (20b) is configured to prioritize and operate one of the plural notification controls which operate duplicately in a case where there are the plural in-vehicle devices in which the event occurs.

Accordingly, the seat apparatus for the vehicle may operate the notification output by the operation of the buzzer more efficiently.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
an electronic control unit configured to:
control each of a plurality of seats sharing a buzzer to move in accordance with an operation request;
detect an occurrence of an event making the buzzer operate for each of the plurality of seats sharing the buzzer; and
separate from detecting the occurrence of the event, operate a notification control of the buzzer in accordance with the event, including:
in a case where there are the plurality of seats in which the event occurs, prioritizing and operating only one of the plurality of notification controls which would otherwise operate duplicately,
wherein the electronic control unit, which detects the occurrence of the event, is the same entity that operates the notification control of the buzzer in accordance with the event.

2. The seat apparatus for the vehicle according to claim 1, wherein the electronic control unit is configured to:
detect a start of an operation control of a component included in each of the plurality of seats as the event, and
in a case where there are the plurality of seats starting the operation control, prioritize and operate the notification control indicating the start of the operation control of the seat of which the operation control starts first among the plurality of notification controls which would otherwise operate duplicately to notify the start of the operation control of each of the plurality of seats.

3. The seat apparatus for the vehicle according to claim 2, wherein in a case where there is the seat of which the operation control starts followingly during the notification control indicating the start of the operation control of one of the plurality of seats, the electronic control unit is configured to not operate the notification control indicating the start of the operation control of the seat of which the operation control starts followingly.

4. The seat apparatus for the vehicle according to claim 3, wherein the electronic control unit is configured to:
detect an end of the operation control of the component included in each of the plurality of seats as the event, and
in a case where there are the plurality of seats ending the operation control, prioritize and operate the notification control indicating the end of the operation control of the seat of which the operation control ends lastly among the plurality of notification controls which would otherwise operate duplicately to notify the end of the operation control of each of the plurality of seats.

5. The seat apparatus for the vehicle according to claim 3, wherein
each of the plurality of seats is a retractable seat in which the component is retracted in a folded state in a storage recessed portion provided at a vehicle floor, and
the operation control is at least one of an extending control extending the component retracted in the storage recessed portion on the vehicle floor and a retracting control retracting the component extended on the vehicle floor in the storage recessed portion.

6. The seat apparatus for the vehicle according to claim 3, wherein the electronic control unit is configured to:
store a priority for each of the events which include a plurality of types and are detected, and
prioritize and operate the notification control for one event having a higher priority than the other event in a case where the different types of events occur duplicately.

7. The seat apparatus for the vehicle according to claim 2, wherein the electronic control unit is configured to:
detect an end of the operation control of the component included in each of the plurality of seats as the event, and
in a case where there are the plurality of seats ending the operation control, prioritize and operate the notification control indicating the end of the operation control of the seat of which the operation control ends lastly among the plurality of notification controls which would otherwise operate duplicately to notify the end of the operation control of each of the plurality of seats.

8. The seat apparatus for the vehicle according to claim 2, wherein
each of the plurality of seats is a retractable seat in which the component is retracted in a folded state in a storage recessed portion provided at a vehicle floor, and
the operation control is at least one of an extending control extending the component retracted in the storage recessed portion on the vehicle floor and a retracting control retracting the component extended on the vehicle floor in the storage recessed portion.

9. The seat apparatus for the vehicle according to claim 8, wherein the electronic control unit is configured to:
store a priority for each of the events which include a plurality of types and are detected, and
prioritize and operate the notification control for one event having a higher priority than the other event in a case where the different types of events occur duplicately.

10. The seat apparatus for the vehicle according to claim 2, wherein the electronic control unit is configured to:
store a priority for each of the events which include a plurality of types and are detected, and
prioritize and operate the notification control for one event having a higher priority than the other event in a case where the different types of events occur duplicately.

11. The seat apparatus for the vehicle according to claim 1, wherein the electronic control unit is configured to:
detect an end of an operation control of a component included in each of the plurality of seats as the event, and
in a case where there are the plurality of seats ending the operation control, prioritize and operate the notification control indicating the end of the operation control of the seat of which the operation control ends lastly among the plurality of notification controls which would otherwise operate duplicately to notify the end of the operation control of each of the plurality of seats.

12. The seat apparatus for the vehicle according to claim 11, wherein
in a case where the end of the operation control operated in one of the plurality of seats is detected, and
in a case where there is the seat of which the operation control is estimated to end followingly before a duplication determination time which is set longer than a notification time of the buzzer indicating the end of the operation control has passed,
the electronic control unit is configured to not operate the notification control indicating the end of the operation control of the seat of which the end of the operation control is detected prior to the operation control of the other seat.

13. The seat apparatus for the vehicle according to claim 12, wherein
each of the plurality of seats is a retractable seat in which the component is retracted in a folded state in a storage recessed portion provided at a vehicle floor, and
the operation control is at least one of an extending control extending the component retracted in the storage recessed portion on the vehicle floor and a retracting control retracting the component extended on the vehicle floor in the storage recessed portion.

14. The seat apparatus for the vehicle according to claim 12, wherein the electronic control unit is configured to:
store a priority for each of the events which include a plurality of types and are detected, and
prioritize and operate the notification control for one event having a higher priority than the other event in a case where the different types of events occur duplicately.

15. The seat apparatus for the vehicle according to claim 11, wherein
each of the plurality of seats is a retractable seat in which the component is retracted in a folded state in a storage recessed portion provided at a vehicle floor, and
the operation control is at least one of an extending control extending the component retracted in the storage recessed portion on the vehicle floor and a retracting control retracting the component extended on the vehicle floor in the storage recessed portion.

16. The seat apparatus for the vehicle according to claim 11, wherein the electronic control unit is configured to:
store a priority for each of the events which include a plurality of types and are detected, and
prioritize and operate the notification control for one event having a higher priority than the other event in a case where the different types of events occur duplicately.

17. The seat apparatus for the vehicle according to claim 1, wherein the electronic control unit is configured to:
store a priority for each of the events which include a plurality of types and are detected, and
prioritize and operate the notification control for one event having a higher priority than the other event in a case where different types of events occur duplicately.

18. The seat apparatus for the vehicle according to claim 1, wherein the electronic control unit is configured to:
operate the notification control for one event having a highest priority among the events occurring duplicately, and
not operate the notification control for the other event occurring duplicately.

19. The seat apparatus for the vehicle according to claim 1, wherein the electronic control unit is configured to not operate the notification control indicating a start of an operation control of the seat of which the operation control starts followingly in a case where there is the seat of which the operation control starts followingly before a predetermined time which is set longer than a notification time of the buzzer indicating the start of the notification control has passed after the notification control of the buzzer indicating the start of the operation control of one of the plurality of seats starts.

20. A notification device for a vehicle, comprising:
an electronic control unit configured to:
control each of a plurality of in-vehicle devices sharing a buzzer in accordance with an operation request;
detect an occurrence of an event making the buzzer operate for each of the plurality of in-vehicle devices sharing the buzzer; and
separate from detecting the occurrence of the event, operate notification control of the buzzer in accordance with the event, including:
in a case where there are the plurality of in-vehicle devices in which the event occurs, prioritizing and operating only one of the plurality of notification controls which would otherwise operate duplicately,
wherein the electronic control unit, which detects the occurrence of the event, is the same entity that operates the notification control of the buzzer in accordance with the event.

* * * * *